United States Patent
Ayarturk

(10) Patent No.: US 12,482,844 B2
(45) Date of Patent: Nov. 25, 2025

(54) SYSTEM WHERE ELECTRICITY GENERATION EFFICIENCY IS INCREASED BY MEANS OF LIQUIDS WHICH HAVE DIFFERENT DENSITIES

(71) Applicant: REPG ENERJI SISTEMLERI SANAYI VE TICARET ANONIM SIRKETI, Bursa (TR)

(72) Inventor: Hasan Ayarturk, Istanbul (AR)

(73) Assignee: REPG ENERJI SISTEMLERI SANAYI VE TICARET ANONIM SIRKETI, Bursa (TR)

( * ) Notice: Subject to any disclaimer, the term of this patent is extended or adjusted under 35 U.S.C. 154(b) by 508 days.

(21) Appl. No.: 18/044,996

(22) PCT Filed: Aug. 13, 2021

(86) PCT No.: PCT/TR2021/050803
§ 371 (c)(1),
(2) Date: Mar. 13, 2023

(87) PCT Pub. No.: WO2022/060324
PCT Pub. Date: Mar. 24, 2022

(65) Prior Publication Data
US 2023/0352715 A1    Nov. 2, 2023

(30) Foreign Application Priority Data
Sep. 15, 2020 (TR) ................. 2020/14597

(51) Int. Cl.
*H01M 8/22* (2006.01)
*B01D 61/00* (2006.01)
(Continued)

(52) U.S. Cl.
CPC ........... *H01M 8/227* (2013.01); *F03G 7/015* (2021.08); *B01D 61/0022* (2022.08); *B01D 61/005* (2013.01); *H01M 8/04186* (2013.01)

(58) Field of Classification Search
CPC ................. H01M 8/04186; H01M 8/227
See application file for complete search history.

(56) References Cited

U.S. PATENT DOCUMENTS 3,906,250 A * 9/1975 Loeb ................. F03G 7/015
                                                    290/1 R
4,171,409 A   10/1979 Loeb
(Continued)

FOREIGN PATENT DOCUMENTS

CN     109617455 A    4/2019
JP     2018158318 A   10/2018
(Continued)

*Primary Examiner* — Imran Akram
(74) *Attorney, Agent, or Firm* — Bayramoglu Law Offices LLC

(57) ABSTRACT

A system for generating electricity from a high density liquid and a low density liquid is provided. The system includes a first liquid chamber, a first drive chamber, at least one permeable wall and at least one pressure retaining osmosis membrane, a first ejector, and a first liquid channel; and a second liquid chamber, a second drive chamber, at least one permeable wall and at least one pressure retaining osmosis membrane, a second ejector, and at least two electrodes.

12 Claims, 1 Drawing Sheet

(51) Int. Cl.
*F03G 7/00* (2006.01)
*H01M 8/04186* (2016.01)

(56) References Cited

U.S. PATENT DOCUMENTS

| | | | | |
|---|---|---|---|---|
| 4,248,043 | A * | 2/1981 | Stewart, Sr. | F03B 17/00 |
| | | | | 417/108 |
| 6,185,940 | B1 * | 2/2001 | Prueitt | C02F 1/441 |
| | | | | 60/649 |
| 10,038,331 | B1 * | 7/2018 | Aylesworth | F03G 7/005 |
| 2001/0028977 | A1 * | 10/2001 | Kazacos | H01M 8/20 |
| | | | | 429/188 |
| 2008/0085431 | A1 * | 4/2008 | Kohno | H01M 8/04194 |
| | | | | 429/448 |
| 2014/0138956 | A1 * | 5/2014 | Sano | F03B 13/00 |
| | | | | 290/54 |
| 2014/0284929 | A1 * | 9/2014 | Taniguchi | B01D 61/0022 |
| | | | | 210/637 |
| 2015/0249378 | A1 * | 9/2015 | Sano | F03B 17/06 |
| | | | | 290/52 |
| 2021/0221351 | A1 * | 7/2021 | Novek | F03B 13/06 |
| 2022/0178337 | A1 * | 6/2022 | Novek | F03B 13/06 |

FOREIGN PATENT DOCUMENTS

| | | | |
|---|---|---|---|
| KR | 20140082963 | A | 7/2014 |
| KR | 20150005859 | A | 1/2015 |

\* cited by examiner

SYSTEM WHERE ELECTRICITY GENERATION EFFICIENCY IS INCREASED BY MEANS OF LIQUIDS WHICH HAVE DIFFERENT DENSITIES

CROSS REFERENCE TO THE RELATED APPLICATIONS

This application is the national phase entry of International Application No. PCT/TR2021/050803, filed on Aug. 13, 2021, which is based upon and claims priority to Turkish Patent Application No. 2020/14597, filed on Sep. 15, 2020, the entire contents of which are incorporated herein by reference.

TECHNICAL FIELD

The present invention relates to a system for generating electricity from a high density liquid and a low density liquid.

BACKGROUND

Energy generation from the density difference of two liquids is known in the art. A very dense liquid and a less dense liquid are separated by means of pressure retaining membranes, and solvent passes from the very dense liquid to the less dense liquid and the pressure of the less dense liquid is increased and energy is generated by means of this increasing pressure. However, movable parts like turbine, pump are needed for this purpose, and this increases installation and maintenance costs.

In the patent application with number KR20140082963, a system which provides generation of electricity by means of turbine by increasing pressure of clean water, from sea water and clean water carried with pump and separated from each other by means of a pressure retaining membrane is disclosed. The abovementioned disadvantages are also valid for this system.

In the application with number U.S. Pat. No. 4,171,409A, electricity is generated from the charge difference formed by ion passage thanks to the electrodes by means of separating two liquids with different densities by inverse electrodialysis method and by means of providing ion passage. The liquids in this system must be continuously moved by means of pumps. The movable parts of pumps lead to noise and wear more rapidly when compared with the motionless parts and increases the installation and maintenance costs. Moreover, a part of the produced electricity must be consumed for the pumps. As a result, because of the abovementioned problems, an improvement is required in the related technical field.

SUMMARY

The present invention relates to a system for generating electricity, for eliminating the abovementioned disadvantages and for bringing new advantages to the related technical field.

An object of the present invention is to provide a system which provides generation of electricity by means of liquids having different densities and which consumes less energy meanwhile.

Another object of the present invention is to provide a system which provides generation of electricity by using liquids which have different densities without needing movable parts.

In order to realize the abovementioned objects and the objects which are to be deducted from the detailed description below, the present invention is a system for generating electricity from a high density liquid and a low density liquid. Accordingly, the subject matter system includes a first liquid chamber having a first inlet for taking said high density liquid as input; a first drive chamber provided in said first liquid chamber; at least one permeable wall having at least two ion selective membranes for providing ion passage from the high density liquid to the first drive chamber and at least one pressure retaining osmosis membrane for providing solvent passage from the high density liquid to the liquid with increasing density in the first drive chamber; a first ejector which is in venturi type and including a drive end connected hydraulically to the first drive chamber and a suction end which provides suctioning when the pressure of the liquid in said drive end increases and hydraulically connected to the first liquid chamber, and a spray end for providing exiting of the liquid taken from the suction end and exiting of the liquid taken from the drive end by gaining pressure; a first liquid channel connected to said first ejector and which has a first outlet;

the subject matter system includes a second liquid chamber having a second inlet for taking said low density liquid as input; a second drive chamber provided in said second liquid chamber; at least one permeable wall having at least two ion selective membranes for providing ion passage from the low density liquid to the second drive chamber and at least one pressure retaining osmosis membrane for providing solvent passage from the low density liquid to the liquid with increasing density in the second drive chamber; a second ejector which is in venturi type and including a drive end connected hydraulically to the second drive chamber and a suction end which provides suctioning when the pressure of the liquid in said drive end increases and hydraulically connected to the second liquid chamber, and a spray end for providing exiting of the liquid taken from the suction end and exiting of the liquid taken from the drive end by gaining pressure; the spray end of said second ejector is connected to a second outlet; at least two electrodes in at least one of the first chamber and the second chamber in order to transform the charge difference, formed by the permeable walls, into electricity. Thus, electricity is generated without needing movable parts and without needing additional energy for the structures which move the liquids.

In a possible embodiment of the present invention, the subject matter system includes at least one permeable wall which includes at least one pressure retaining membrane and at least two ion selective membranes having opposite poles and provided between the first liquid channel and the second liquid chamber.

In another possible embodiment of the present invention, at least two permeable walls are provided between the first liquid channel and the second liquid chamber, and the ion selective membranes of the permeable walls are configured to allow passage of ions which have opposite poles with respect to each other.

In another possible embodiment of the present invention, at least one part of the first liquid channel is configured to pass through the second liquid chamber.

In another possible embodiment of the present invention, the first drive chamber includes two permeable walls, and the ion selective membranes of the permeable walls are configured to allow passage of ions which have opposite poles with respect to each other.

In another possible embodiment of the present invention, at least two of said electrodes are provided against the ion selective membranes in the first liquid chamber for providing generation of current from the ion exchange formed by the opposite charged ion selective membranes.

In another possible embodiment of the present invention, at least one of the electrodes is provided in a manner contacting both liquids between the first liquid chamber and the second liquid chamber.

In another possible embodiment of the present invention, the second drive chamber includes two permeable walls, and the ion selective membranes of the permeable walls are configured to allow passage of ions which have opposite poles with respect to each other.

In another possible embodiment of the present invention, at least two of said electrodes are provided against the ion selective membranes in the second liquid chamber for providing generation of electricity from the ion exchange formed by the opposite charged ion selective membranes.

In another possible embodiment of the present invention, the subject matter system includes ion selective membrane support provided between the ion selective membranes and the liquids In another possible embodiment of the present invention, the permeable walls include membrane housings for the fixation of the ion selective membrane and the pressure retaining osmosis membranes.

In another possible embodiment of the present invention, an energy generation unit is provided for transforming the voltage difference in electrodes into electricity.

REFERENCE NUMBERS

Figure 1:
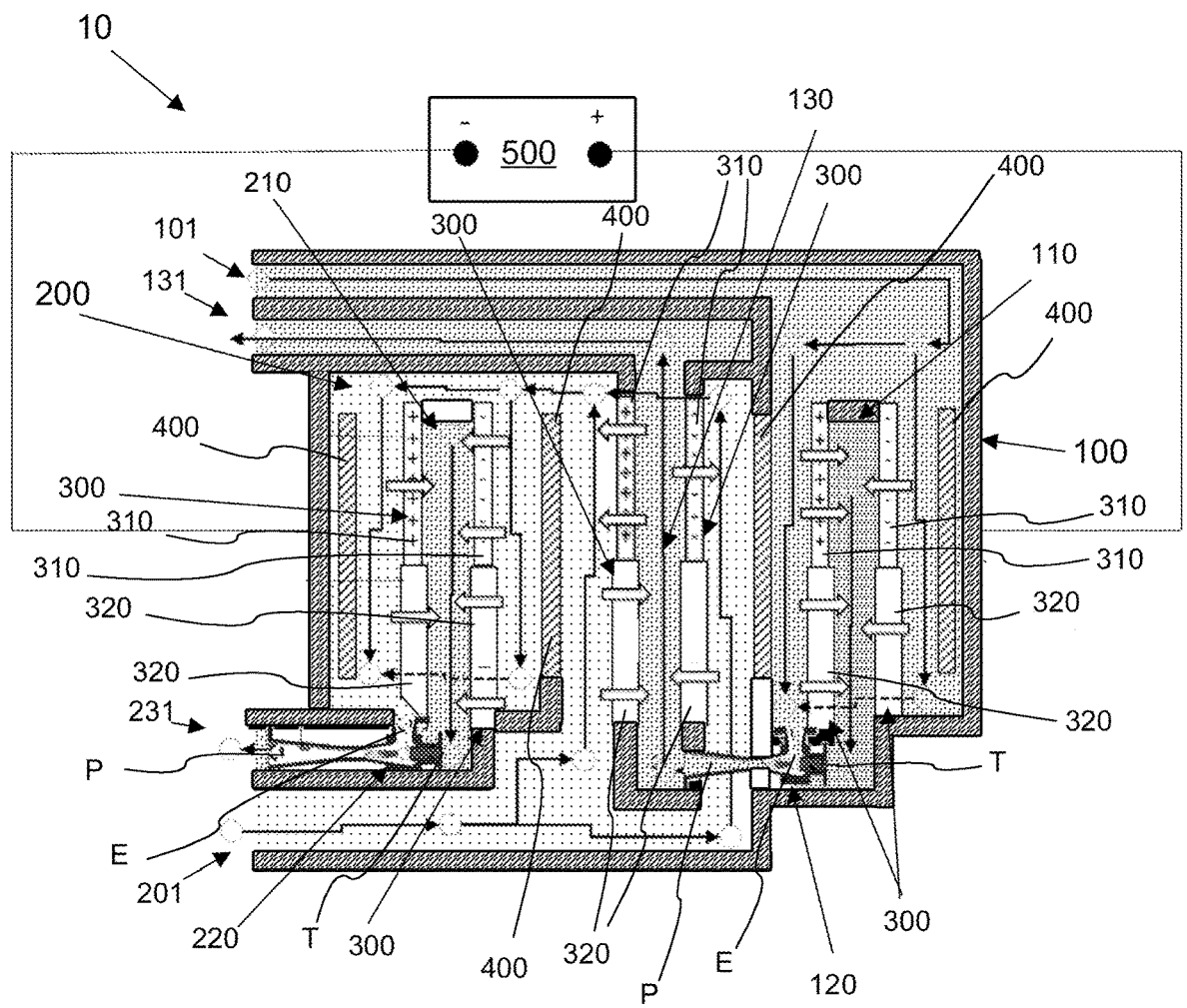
In FIG. 1, a representative view of the system is given.
Figure 2:
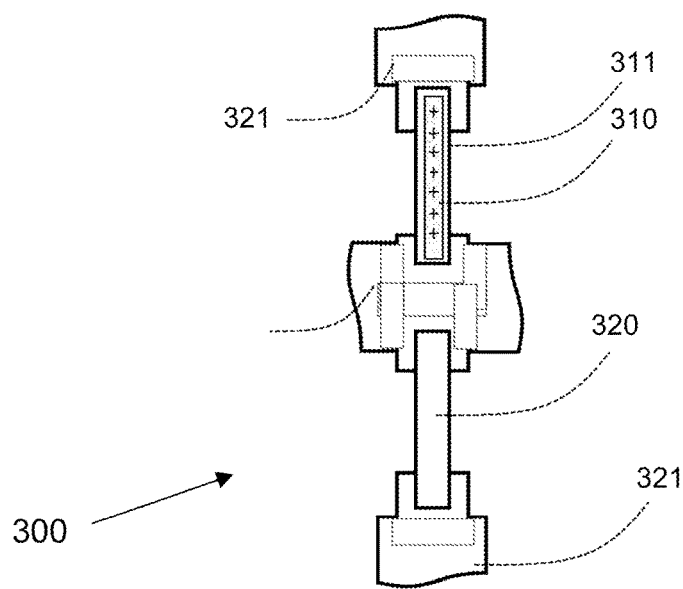
In FIG. 2, a more detailed representative view of the permeable wall is given.

10 System
100 First liquid chamber
101 First inlet
110 First drive chamber
120 First ejector
  T drive end
  E suction end
  P spray end
130 First liquid channel
131 First outlet
200 Second liquid chamber
201 Second inlet
210 Second drive chamber
220 Second ejector
231 Second outlet
300 Permeable wall
310 Ion selective membrane
311 Ion selective membrane support
320 Pressure retaining osmosis membrane
321 Membrane housing
400 Electrode
500 Energy generation unit

DETAILED DESCRIPTION OF THE EMBODIMENTS

In this detailed description, the subject matter is explained with references to examples without forming any restrictive effect only in order to make the subject more understandable.

The present invention relates to a system (10) which provides generation of electricity by using density difference of a high density liquid and a low density liquid essentially having different densities and which does not use movable components and which consumes less energy.

With reference to FIG. 1, the system (10) includes a first liquid chamber (100) for receiving high density liquid through a first inlet (101). Said first liquid chamber (100) has a first drive chamber (110). Said first drive chamber (110) includes at least one permeable wall (300) having at least one ion selective membrane (310) for providing ion passage from the high density liquid to the first drive chamber (110) by the first drive chamber (110), and at least one pressure retaining osmosis membrane (320) for providing solvent passage from the high density liquid to the liquid having increasing density in the first drive chamber (110).

As known in the art, the ion selective membrane (310) provides passage of ions, which have a polarity, from the side where said ions are plenty to the side where said ions are less in number. For instance, the positive selective membrane provides passage of positive ions from the side where positive ions are plenty to the side where positive ions are less until the ions become equalized. It is used in inverse electrodialysis systems in the art. The pressure retaining osmosis membrane (320) provides solvent passage from the liquid with low density to the liquid with high density. For instance, when the sea water and the fresh water are separated by means of a pressure retaining osmosis membrane (320), water passes from the sea water to the fresh water, and the height of the fresh water increases, and if said fresh water is kept in a fixed volume, the pressure thereof increases.

In a possible embodiment of the present invention, the first drive chamber (110) includes at least two permeable walls (300). The ion selective membrane (310) of one of the permeable walls (300) is selected to allow passage of ions having poles which are opposite with respect to the ion selective membrane (310) of the other one of the permeable walls (300). Ion passage occurs from the high density liquid to the liquid, which exists in the first drive chamber (110), by means of ion selective membranes (310). Solvent passage occurs to the liquid, which becomes denser since ion passage occurs, by means of pressure retaining membranes, and the pressure of the liquid which exists in the first drive chamber (110) increases.

The first liquid chamber (100) includes a first ejector (120) which is in venturi type. The first ejector (120) has a drive end (T) connected to the first drive chamber (110), a suction end (E) which provides suctioning when pressured water comes from the drive end (T) and opened to the first liquid chamber (100), a spray end (P) which suctions the liquid at the suction end (E) when pressured liquid comes from the drive end (T) and which discharges together with the pressured liquid. The spray end (P) is connected to a first liquid channel (130). The first liquid channel (130) provides discharge of the high density liquid through a first outlet (131).

The first liquid chamber (100) includes electrodes (400) provided in the vicinity of the ion selective membranes (310). These electrodes (400) provide transformation of the voltage difference, which results from changing of the ion balance by the high density liquid by means of the ion selective membranes (310), into electricity. The electrodes (400) are positioned against the ion selective membranes (310) in the first liquid chamber (100). An energy generation unit (500) is associated with the electrodes (400). The energy generation unit (500) can include components which provide rectification of the obtained current and passage thereof through various processes.

The system includes a second liquid chamber (200) for taking the low density liquid through a second inlet (201). Said second liquid chamber (200) has a second drive chamber (210). Said second drive chamber (210) includes at least one permeable wall (300) having at least one ion selective membrane (310) for providing ion passage from the low density liquid to the liquid, which exists in the first drive chamber (110), by the second drive chamber (210), and at least one pressure retaining osmosis membrane (320) for providing solvent passage from the low density liquid to the liquid, having increasing density, in the first drive chamber (110).

In a possible embodiment of the present invention, the second drive chamber (210) includes at least two permeable walls (300). The ion selective membrane (310) of one of the permeable walls (300) is selected in a manner allowing passage of ions which have opposite pole with respect to the ion selective membrane (310) of the other one of the permeable walls (300). Ion passage occurs from the low density liquid to the liquid, which exists in the second drive chamber (210), by means of ion selective membranes (310). Solvent passage occurs to the liquid, which becomes denser since ion passage occurs, by means of the pressure retaining membranes, and the pressure of the liquid which exists in the second drive chamber (210) increases.

The second liquid chamber (200) includes a second ejector (220) which is in venturi type. The second ejector (220) has a drive end (T) connected to the second drive chamber (210), a suction end (E) which provides suctioning when pressured water comes from the drive end (T) and opened to the second liquid chamber (200), a spray end (P) which suctions the liquid at the suction end (E) when pressured liquid comes from the drive end (T) and which discharges together with the pressured liquid. The spray end (P) provides discharge of the liquid by means of a second outlet (231).

The second liquid chamber (200) includes electrodes (400) provided in the vicinity of ion selective membranes (310). These electrodes (400) provide transformation of the voltage difference, which result from changing of the ion balance by the high density liquid by means of the ion selective membranes (310), into electricity. The electrodes (400) are positioned against the ion selective membranes (310) in the second liquid chamber (200).

In a possible embodiment of the present invention, the first liquid channel (130) passes through the second liquid chamber (200). The first liquid channel (130) includes at least one permeable wall (300).

The ion selective membrane (310) of one of the permeable walls (300) is selected in a manner allowing passage of ions which have opposite poles with respect to the ion selective membrane (310) of the other one of the permeable walls (300). Ion and solvent passage occurs by means of walls through the first liquid channel (130) to the second liquid chamber (200). Thus, the pressure of the second liquid and the ion amount also increase. The second drive chamber (210) exerts more pressure to the second ejector (220).

In a possible embodiment of the present invention, one of the electrodes (400), which exists in the liquid chamber (200), is provided between the first liquid channel (130) and the second drive chamber (210). One of the electrodes (400), which exist in the first liquid chamber (100), is provided on a mutual wall in a manner both contacting the liquid which exists in the first liquid chamber (100) and the liquid which exists in the second liquid chamber (200).

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A system for generating electricity from a high density liquid and a low density liquid,
wherein the system comprises
a first liquid chamber having a first inlet for taking the high density liquid as input;
a first drive chamber provided in the first liquid chamber;
at least one permeable wall having at least two ion selective membranes for providing an ion passage from the high density liquid to the first drive chamber and at least one pressure retaining osmosis membrane for providing a solvent passage from the high density liquid to a liquid with an increasing density in the first drive chamber;
a first ejector, wherein the first ejector is in a venturi type and comprises a drive end connected hydraulically to the first drive chamber and a suction end and hydraulically connected to the first liquid chamber, and a spray end for providing an exiting of a liquid taken from the suction end and an exiting of a liquid taken from the drive end by a gaining pressure, wherein the suction end provides a suctioning when a pressure of the liquid in the drive end increases; and
a first liquid channel connected to the first ejector, wherein the first liquid channel has a first outlet;
wherein the system comprises a second liquid chamber having a second inlet for taking the low density liquid as input;
a second drive chamber provided in the second liquid chamber;
at least one permeable wall having at least two ion selective membranes for providing an ion passage from the low density liquid to the second drive chamber and at least one pressure retaining osmosis membrane for providing a solvent passage from the low density liquid to a liquid with an increasing density in the second drive chamber;
a second ejector, wherein the second ejector is in a venturi type and comprises a drive end connected hydraulically to the second drive chamber and a suction end and hydraulically connected to the second liquid chamber, and a spray end for providing an exiting of a liquid taken from the suction end and an exiting of a liquid taken from the drive end by a gaining pressure, wherein the suction end provides a suctioning when a pressure of the liquid in the drive end increases; the spray end of the second ejector is connected to a second outlet; and
at least two electrodes in at least one of the first liquid chamber and the second liquid chamber in order to transform a charge difference, formed by the permeable walls, into the electricity.

2. The system according to claim 1, wherein the system comprises at least one permeable wall, wherein the at least one permeable wall comprises at least one pressure retaining membrane and at least two ion selective membranes having opposite poles and provided between the first liquid channel and the second liquid chamber.

3. The system according to claim 2, wherein at least two permeable walls are provided between the first liquid channel and the second liquid chamber, and the ion selective membranes of the permeable walls are configured to allow a passage of ions having opposite poles with respect to each other.

4. The system according to claim 1, wherein at least one part of the first liquid channel is configured to pass through the second liquid chamber.

5. The system according to claim 4, wherein at least one of the at least two electrodes is provided in a manner contacting two liquids between the first liquid chamber and the second liquid chamber.

6. The system according to claim 1, wherein the first drive chamber comprises two permeable walls and the ion selective membranes of the two permeable walls are configured to allow a passage of ions having opposite poles with respect to each other.

7. The system according to claim 6, wherein at least two of the at least two electrodes are provided against the ion selective membranes in the first liquid chamber for providing a generation of current from an ion exchange formed by the opposite charged ion selective membranes.

8. The system according to claim 1, wherein the second drive chamber comprises two permeable walls and the ion selective membranes of the two permeable walls are configured to allow a passage of ions having opposite poles with respect to each other.

9. The system according to claim 8, wherein at least two of the at least two electrodes are provided against the ion selective membranes in the second liquid chamber for providing a generation of electricity from an ion exchange formed by the opposite charged ion selective membranes.

10. The system according to claim 1, wherein the system comprises an ion selective membrane support provided between the ion selective membranes and the liquids.

11. The system according to claim 1, wherein the permeable walls comprise membrane housings for a fixation of the ion selective membrane and the pressure retaining osmosis membranes.

12. The system according to claim 1, wherein an energy generation unit is provided for transforming a voltage difference in the at least two electrodes into the electricity.

* * * * *